United States Patent [19]

Prater et al.

[11] Patent Number: 4,520,083

[45] Date of Patent: May 28, 1985

[54] NON-AQUEOUS ELECTROCHEMICAL CELL AND ELECTROLYTE

[75] Inventors: Keith B. Prater, North Vancouver, Canada; Robert J. Thrash, Carol Stream, Ill.; John F. Connolly, Glen Ellyn, Ill.

[73] Assignee: Standard Oil Company (Indiana), Chicago, Ill.

[21] Appl. No.: 471,429

[22] Filed: Mar. 2, 1983

[51] Int. Cl.³ .................... H01M 4/36; H01M 6/14; H01M 6/04
[52] U.S. Cl. .................................. 429/101; 429/105; 429/194; 429/196; 429/198; 429/199; 429/201; 429/203
[58] Field of Search ............... 429/101, 105, 194, 196, 429/197, 198, 199, 201, 203

[56] References Cited

U.S. PATENT DOCUMENTS

| | | | |
|---|---|---|---|
| 3,567,515 | 3/1971 | Maricle et al. | 429/105 |
| 3,658,593 | 4/1972 | Caiola et al. | 429/194 |
| 4,091,152 | 5/1978 | Rao et al. | 429/101 |
| 4,246,327 | 1/1981 | Skarstad et al. | 429/196 |

*Primary Examiner*—Brian E. Hearn
*Assistant Examiner*—Stephen J. Kalafut
*Attorney, Agent, or Firm*—Richard A. Kretchmer; William T. McClain; William H. Magidson

[57] ABSTRACT

Disclosed is an ambient temperature, rechargeable non-aqueous electrochemical cell having an active metal anode of the second kind, a cathode depolarizer, positive electrode current collector and an electrolyte comprising a solvent, a supporting electrolyte salt, and an active metal salt. Also disclosed is an electrolyte for non-aqueous active metal cells.

12 Claims, No Drawings

NON-AQUEOUS ELECTROCHEMICAL CELL AND ELECTROLYTE

This invention relates to ambient temperature, rechargeable, non-aqueous electrochemical cells. More specifically, this invention relates to ambient temperature, rechargeable, non-aqueous cells having an active metal anode, a cathode depolarizer, a positive electrode current collector and an electrolyte comprising a solvent, a supporting electrolyte salt and an active metal salt. Additionally, this invention relates to an ambient temperature, non-aqueous electrolyte comprising a solvent, a supporting electrolyte salt, and an active metal salt.

Recently much effort has been expended in the development of ambient temperature, high energy density cell systems which provide both higher voltages and total capacity (volumetric and gravimetric) than those of the Leclanche or alkaline cells having zinc anodes. The high energy density cell systems are centered around the use of active metals (metals above hydrogen in the EMF series which are unstable in aqueous environments) as anodes in non-aqueous solution cells. As used herein, "non-aqueous" is intended to mean substantially anhydrous.

High energy output and low weight requires the use of active metals as the electrodes and, in particular active metals having low equivalent weights. The alkali metals qualify in these respects. However, since the alkali metals are generally reactive in electrolyte systems containing water, acids, alcohols, or other proton donating solvents, these liquids must be replaced by solvents incapable of undergoing protolytic reactions with such metals. A continuing problem in the choice of such solvents is the tendency to co-reduction of said solvents during the reduction of alkali metal ions to free metal. Thus, it is apparent that not only must the solvent be miscible with, and promote the electrical conductivity of, the supporting electrolyte salt, but it must also remain substantially chemically inert to the electrodes and electrolyte during storage as well as during operation of the electrochemical system. In like manner, the electrolyte must be chemically inert with respect to the electrodes.

Various cell systems have been developed utilizing lithium as the anode electrode material. The ones showing promise in terms of voltage stability and high discharge capability, are those having fluid cathode depolarizers which also generally serve the function of supporting electrolyte salt solvent. When a cell of this type is not being discharged, the fluid depolarizer/supporting electrolyte solution reacts with the anode metal to a limited extent with a protective film coating being formed on the surface of the anode. Full reaction between the anode and fluid depolarizer with which it is in contact is thereby substantially prevented and cell self-discharge is limited.

To date, active metal battery art has uniformly emphasized the necessity for soluble anode products and insoluble cathode products during discharge, and the concomitant need to facilitate anodic (active metal) ion transport through the electrolyte to the cathode or positive electrode current collector. As recognized in the art, such systems employ anodes which are termed electrodes of the first kind. These are understood to be electrodes in which the potential determining ion in solution is not in equilibrium with a solid salt phase. Such cells are characterized by cell solutions which are unsaturated in the electrode (or potential determining) ion—allowing the concentration of the potential determining ion to be varied at will. As used in the art, such cells are further characterized by (a) very high (although less than saturated) concentrations of the anode ion; (b) soluble discharge products at the anode; and (c) high ion transfer in solution from anode to positive electrode.

For example, Gabano, (U.S. Pat. No. 3,511,716) discloses a cell in which oxidized lithium goes into solution during discharge and migrates toward the positive electrode. Gabano emphasizes that the solubility of Li in the solution must be as high as possible to achieve adequate transfer of Li ions to the positive electrode. Similarly, Skarstad et al (U.S. Pat. No. 4,246,327) discusses $SO_2$ and $SOCl_2$ based batteries which make use of Li ion transport and deposit lithium salts as insoluble discharge products on a high surface area cathode.

More specifically, the art has taught that soluble anode products coupled with insoluble cathode products are required and necessary in active metal secondary batteries. Maricle et al (U.S. Pat. No. 3,567,515) for example, simply state "As a general rule, insoluble [cathode] products are obtained when alkali-metal electrolytes are employed . . . ". In addition, Maricle et al expressly teach that soluble cathode products are not preferred, especially in secondary batteries.

An even more sweeping generalization is found in Eisenberg, "Study of the Secondary Li Electrode in Organic Electrolyte", Final Report on LBL Subcontract 4507210, April 1981. Eisenberg teaches (at page 19) that, for a Li anode in organic, aprotic electrolyte systems, high solubility of Li ion salts is necessary to provide for the necessary ionic transport through the electrolyte. In such systems, Eisenberg concludes that " . . . the solubility of the lithium anode product in the electrolyte appears to be an unavoidable fact of life." (emphasis in original).

Though the art has thus concentrated exclusively upon active metal anodes of the first kind, the hoped-for advantages of greater conversion of the active metal, higher effective current density and improved low temperature behavior have not been practically realized. Instead, a range of problems has plagued virtually all systems employing an active metal anode of the first kind. One such problem results from difficulties in obtaining requisite ionic transport to and from each electrode. During each charging operation, the active material must be transported from within the solution to the surface of the anode base plate. On the other hand, during each discharge the deposited layers must be completely redissolved. Maintaining uniform current distribution and adequate convection in the electrolyte is thus very important with this type of battery. If uniformity of current distribution is inadequate several problems arise:

1. Local problems: formation of dendrites and nodules on the surface of the anode;
2. Asymmetrical deposition of the active materials along the electrode surface (shape change); and
3. Asymmetrical deposition of active materials in the positive electrode.

Additional problems arise from the partially irreversible behavior of the active deposits. As a result of the asymmetry between current efficiencies for deposition and dissolution, and as a result of asymmetry in respect of corrosion processes, the active deposits shown a partially irreversible behavior. Dendrite formation in cells with anodes of the first kind and the attendant problems are discussed in Beck et al (U.S. Pat. No. 4,119,767), by Koch (U.S. Pat. No. 4,252,876), and by Schlaikjer (U.S. Pat. No. 4,139,680). Beck et al and Koch also encountered shape change or morphology problems. The disadvantages of irreversible asymmetrical deposits clogging the cathode are discussed by Beck et al, Fraioli et al (U.S. Pat. No. 3,551,205) and Maricle et al.

In general, attempts to solve such problems associated with an active metal anode of the first kind have centered on (1) electrolyte-solvent combinations (or additives) which increase Li ion solubility, such as those taught by Gabano et al; Skarstad et al; and Eisenberg (U.S. Pat. No. 3,891,458, reissued as U.S. Pat. No. Re. 30,661); (2) additives to help dendrite dissolution such as the teachings of Beck et al; and (3) high surface area cathodes such as those discussed by Maricle et al and Fraioli et al.

To the best of our knowledge, no complete solution to the difficulties inherent in active metal anodes of the first kind has yet been found. This failure has prevented the development of an active metal secondary battery which is light weight, provides stable voltage at open circuit, operable at ambient temperatures, has large energy density, and can be reliably cycled through numerous charge/discharge cycles. A need exists for a secondary battery with the desirable characteristics expected of an active metal based electrochemical cell, but without the present disadvantages.

It is a general object of this invention to develop a rechargeable, non-aqueous, ambient temperature electrochemical cell which resists dendrite formation and morphology changes. It is a further object of this invention to develop a rechargeable electrochemical cell and electrolyte which employs an active metal anode which is an electrode of the second kind. It is a still further object of this invention to develop an electrolyte capable of sustaining a large number of charge-discharge cycles in a secondary cell with an electrode of the second kind. Further objects will be apparent from the following discussion and examples.

SUMMARY OF THE INVENTION

We have discovered a non-aqueous, ambient temperature, rechargeable electrochemical cell utilizing an active metal anode which is an electrode of the second kind. Generally, electrodes of the second kind are considered those in which the potential determining ion in solution is in equilibrium with a solid salt phase. The activity and concentration of the potential determining ion is thus controlled by this equilibrium condition. The cell in accord with this invention exhibits a stable open circuit voltage at ambient temperatures and maintains a relatively high cycling efficiency through a number of charge/discharge cycles. As used herein, the terms "active metal" and "active metal cation" are meant to refer to the active metal used as the active material of the anode in the metal ($M^°$) and cation ($M^+$) form, respectively.

In general, the objects of this invention can be achieved by a non-aqueous rechargeable electrochemical cell comprising an active metal anode, a cathode depolarizer, a positive electrode current collector, and an electrolyte comprising an ionizing solvent, a salt of said active metal, and a supporting electrolyte salt comprising at least one component of the general form $R^+X^-$, wherein $R^+$ is a cation different from the cation of said active metal, and $X^-$ is an anion which forms a salt with the cation of said active metal which is less soluble in said cell than $R^+X^-$, and wherein the saturated concentration of said active metal cation in said cell is between about $10^{-9}$ eq/l and $10^{-1}$ eq/l, and said active metal cation is present in a concentration between about $10^{-9}$ eq/l and about $10^{-1}$ eq/l.

As used herein, the term "supporting electrolyte salt" refers to the primary conducting component in the electrolyte acting as the principal current carrier. While other conducting salts can be present, the supporting electrolyte salt is present in the highest concentration. Moreover, salts or ions which have saturated concentrations between about $10^{-9}$ eq/l and about $10^{-1}$ eq/l in the cell solution are referred to herein as "slightly soluble" salt or ions. It should be understood that generic representation of ions (such as $R^+$ or $X^-$) refer to ions which can carry one or more positive or negative charges and are not intended, therefore, to denote only singly charged ions. References to cation or anion solubility herein, generally speaking, refer to the solubility of salts containing said ions.

The objects of this invention can also be attained by an improved electrolyte for use in an electrochemical cell having an active metal anode, a cathode depolarizer and a positive electrode current collector wherein said improved electrolyte comprises an ionizing solvent, a salt of said active metal anode material, and a supporting electrolyte salt comprising at least one component of the general form $R^+X^-$, wherein $R^+$ is a cation different from the cation of said active metal anode material, and $X^-$ is an anion which forms a salt with said anode cation which is less soluble in said electrolyte than $R^+X^-$, and wherein the saturated concentration of said anode material cation is between about $10^{-9}$ eq/l and about $10^{-1}$ eq/l.

Briefly, the invention is a novel rechargeable cell wherein the anode is an electrode of the second kind due to the presence of a novel electrolyte. Upon discharge, active metal cations ($M^+$) ejected from the anode combine with anion ($X^-$), already present in relatively high concentration in the cell solution, to form a slightly soluble active metal salt ($M^+X^-$) which then precipitates onto the anode. At the positive electrode, the cathode depolarizer is reduced to a product which can be either soluble or insoluble in the cell solution. During charge, the slightly soluble active metal salt on the anode ($M^+X^-$) redissolves: the anion ($X^-$) goes back into solution and the active metal cation ($M^+$) is reduced back to metal form at the anode. At the positive electrode, the reduction product is oxidized back to the original state of the cathode depolarizer.

The key feature of this invention is the formation of an anode which is an electrode of the second kind through judicious selection of certain cell components. In particular, the proper combination of electrolyte components (solvent, supporting electrolyte salt and active metal salt) are important to the operation of the present invention. Critical factors include selection of the electrolyte such that the active metal cation is only slightly soluble in the cell solution and the presence of a relatively high concentration of the supporting electrolyte anion ($X^-$) which forms a slightly soluble salt with active metal cations. In short, if $M^+$ is the active metal cation, and $X^-$ is the anion of the supporting electrolyte salt, then both $M^+$ and $M^+X^-$ should be slightly soluble in the electrolyte of this invention.

Moreover, sufficient $M^+$ ion should be present in the electrolyte to substantially saturate the cell solution—thereby promoting precipitation of $M^+X^-$ on the anode.

In functional terms, for purposes hereof, a "high concentration of $X^-$ anion" is considered to be an amount which is large when compared with the amount of active metal cation ($M^+$) expected to evolve from the anode during discharge. Alternatively, the $X^-$ concentration should be sufficiently large such that the removal of some $X^-$ from solution through combination with the active metal cations ($M^+$) evolving into solution during discharge does not appreciably affect or reduce the bulk $X^-$ concentration.

Our tests have indicated that active metal cation concentrations at or near saturation yield the most promising results. Thus, while the active metal cation, $M^+$, should be only slightly soluble in the cell solution, for best results sufficient $M^+$ should be present (produced by the addition of an active metal salt, for example) to bring the solution to a condition substantially saturated in $M^+$.

We believe our electrochemical cell and electrolyte are surprising because the art has consistently taught that anodes of the first kind in active metal cells are the preferred electrodes. Indeed, the art has actually taught that anodes of the first kind are the only acceptable type of electrodes in such cells. This teaching has been punctuated by the fact that, when faced with numerous problems inherent in anodes of the first kind, the art has devoted considerable effort to overcoming these problems rather than seek an alternative approach. We believe our cell and electrolyte represent such alternative approaches which substantially avoid or alleviate most of the problems encountered when using anodes of the first kind.

DETAILED DESCRIPTION

Anodes in accord with the present invention comprise at least one active component selected from the group consisting of alkali metals, alkaline earth metals, transition metals, rare earth metals and Group IIIA metals wherein said active component is above hydrogen in the EMF series and is thermodynamically unstable in aqueous environments.

Suitable anode metals comprise alkali metals and alkaline earth metals having reduction potentials more negative than about $-1$ volt and, preferably, more negative than about $-2$ volts. Examples of preferred alkali metals are lithium, sodium and potassium; preferred alkaline earth metals include maagnesium and calcium. Of these, lithium is most preferred.

It is understood that such anode metals can be employed singly or in mixtures, alloys and intermetallic compounds of two or more metals. Anode metals in accord with the present invention can be used in a variety of physical forms such as films, powders, compacts or screens and used alone or in combination with both conducting and non-conducting substrates.

In general, positive cathode depolarizers useful in this invention undergo rapid reversible electron transfer, have long term compatibility with the other components of the cell, and have relatively high potential with respect to the anode and low equivalent weight. Typically, in cells wherein no passivating film is formed on the anode by passivating action of the chosen solvent, the cathode depolarizer is insoluble to prevent direct chemical reaction with the anode (self-discharge). Preferably, however, the solvent and anode metal are chosen such that a passivating film is formed on the anode—thereby allowing the use of a soluble cathode depolarizer. In general, a soluble cathode depolarizer provides much greater latitude in the choice of suitable cell components. Strictly speaking, as used herein "soluble cathode depolarizer" is meant to refer to the depolarizer in oxidized form (i.e., prior to discharge). During discharge, the depolarizer is reduced at the positive electrode to a form which can be either soluble or insoluble. Preferably, both the oxidized and reduced form of the cathode depolarizer are soluble. Such a system obviates the search for ultra high surface area positive electrodes. In general, it is expected that the degree of solubility of the depolarizer determines its current carrying capabilities.

Suitable cathode depolarizers comprise electrochemical couples wherein the oxidized form is reversibily reducible at the positive electrode. Examples of such couples include $SO_2/S_2O_4^=$ and $Ag^+/Ag$; halogen/halide couples such as $Cl_2/Cl^-$ and $F_2/F^-$; free and coordinated metal ion redox couples such as $Fe(CN)_6^{-3}/Fe(CN)_6^{-4}$ and reversible organic couples such as thianthrene cation/thianthrene. Of these, most preferred is $SO_2/S_2O_4^=$. It is to be understood that the oxidized or reduced forms of the above couples can be present in particular cell solutions as slightly soluble salts.

Positive electrode current collector design can be either of two types depending upon the solubility of the depolarizer and its reduction product formed at the current collector during discharge. When both forms of the depolarizer are soluble the positive electrode material and its form are non-critical, (although a catalytic surface may be required in some instances). In this case, the depolarizer can simply be added to the cell solution. The material of the current collector can be any which serves as a conductor of electrons and which is substantially inert to the electrolyte and the depolarizer, i.e, which serves to transmit electrons to the depolarizer acting as an electron acceptor or oxidizing agent. By "substantially inert" is meant the substantial absence of chemical or physical (except electrochemical) interaction of the material with the depolarizer such as chemical oxidation, physical disintegration, dissolution, precipitation or coagulation during the useful life of the battery.

Preferred positive electrode materials for such soluble cathode product cells are metals of the platinum family including platinum, iridium, osmium, palladium, rhodium and ruthenium; carbon in any of its common electrode forms such as sintered, compacted, powdered or in rod form, alone or over platinum, iron in various forms, particularly as stainless steel; and titanium, nickel, silver, mercury, lead and gold. Less preferred materials are metals of the families of vanadium, chromium, and manganese (Groups IVB, VB, VIB, VIIB, and VIII); copper, zinc, cadmium, germanium, tin, antimony and bismuth; certain nitrides such as boron nitride; and semi-conductors such as silicon-containing substances. All of these materials can take any of the various forms conventional in the art such as rods, compacts, powders, pastes and the like.

When the depolarizer or its reduction product is relatively insoluble, deposits can precipitate on the positive electrode surface—possibly blocking the electrode and preventing further reaction. Of course, under such conditions, a high surface area positive electrode is desirable.

Electrolytes useful in the present invention are generally multi-component systems comprising an ionizing solvent, a supporting electrolyte salt and a salt of the active metal. Suitable solvents are compounds which cause salts to ionize and are relatively inert with respect to the other components of the cell while promoting the solubility and conductivity of the supporting electrolyte salt. The presence of the active metal salt serves to aid in approaching or achieving saturation of active metal cation in solution—a necessary condition for the anode to function as an electrode of the second kind. The supporting electrolyte salt serves as the principal current carrier.

More specifically, solvents most useful in this invention are those which form a passivating film on the surface of the active metal anode of choice. Such solvents comprise liquid organic and inorganic compounds which contain one or more atoms having at least one unshared pair of electrons and which lack acidic hydrogen atoms. For purposes hereof, "acidic hydrogen atoms" are those which are capable of being abstracted by the anode metal. Generally, strongly basic solvents such as amines, are not desirable.

Such solvents are inorganic or organic compounds comprising at least one component selected from the group consisting of Group IIIA, IVA, VA and VIA elements. Preferred organic solvents comprise nitriles, ethers, and cyclic ethers comprising at least one component selected from the group consisting of sulfur, boron, silicon, nitrogen, phosphorous, and oxygen. Preferred inorganic solvents comprise at least one component selected from the group consisting of oxides, halides and oxyhalides of sulfur, phosphorous, selenium and arsenic. Of these, most preferred are sulfur dioxide and thionyl chloride.

Sulfur dioxide is preferred due to its ability to form a passivating (yet ion conducting) film on active metal anodes. Also advantageous is the fact that sulfur dioxide can perform the dual function of both solvent and cathode depolarizer. Thus, liquid sulfur dioxide is a very efficacious cell component.

Supporting electrolyte salts useful in accord with the present invention generally have high conductivity in solution. The supporting electrolyte salt should typically be highly soluble in the solvent or if a fluid depolarizer is employed, highly soluble in the solvent/depolarizer solution. The electrolyte salt should also be substantially stable with respect to the solvent, depolarizer and anode metal. Of particular importance, supporting electrolyte salts useful in this invention are those which form solutions in which the cation of the active metal (M+) is only slightly soluble.

Suitable supporting electrolyte salts comprise at least one component of the general form $R^+X^-$ wherein said salt has no acidic hydrogen atoms. The cationic component, $R^+$ is different from $M^+$ and comprises at least one compound selected from the group consisting of metal ion complexes and nitrogen and phosphorus organic cations.

Said metal ion complexes comprise at least one compound selected from the group consisting of alkali metals complexed with crown ethers, such as Na+. 15-crown-5, alkali metals complexed with cryptands, such as $K(C_{18}H_{36}N_2O_6)$, transition metals complexed with ligands and chelates, such as

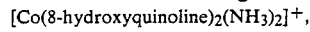
[Co(8-hydroxyquinoline)$_2$(NH$_3$)$_2$]+, and transition metals complexed with chelating ligands, such as

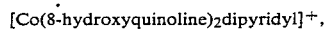
[Co(8-hydroxyquinoline)$_2$dipyridyl]+,

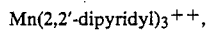
Mn(2,2'-dipyridyl)$_3$++,

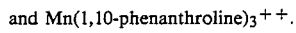
and Mn(1,10-phenanthroline)$_3$++.

Of the metal ion complexes, Mn(2,2'-dipyridyl)$_3$++ and Mn(1,10-phenanthroline)$_3$++ cations are preferred.

Said nitrogen and phosphorus organic cations comprise at least one component selected from the group consisting of the cations of quaternary ammonium and phosphonium salts, and N-hydrocarbo heterocyclic cations. Examples of such cations include [(n-butyl)$_4$N]+, [(C$_6$H$_5$)$_3$PCH$_3$]+ and

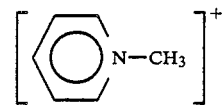

Of these, tetra-n-butyl ammonium cations are preferred.

The anionic component, $X^-$, of said supporting electrolyte salt comprises any anion which combines with the M+ of choice to form a slightly soluble salt, $M^+X^-$, which is less soluble than $R^+X^-$ solvent of choice, and is stable at the positive electrode (except in those cases wherein the anion is the same as the reduction product formed at the positive electrode during discharge-e.g. dithionite). Suitable anions comprise at least one component selected from the group consisting of halide, trihalide, interhalide and oxyhalide anions, oxyacid, halide, and organic anions of Group IIIA to Group VIA elements, and anionic complexes of transition and rare earth metals. Of these, oxyhalide and oxyacid anions such as perchlorate and dithionite anions are preferred.

Our tests have indicated that the supporting electrolyte salt in accord with the present invention should be sufficiently soluble in the solvent or solvent/depolarizer solution to produce a concentration between about 0.01 eq/l and about 5.0 eq/l, and preferably between about 0.01 eq/l and about 4.0 eq/l. For the preferred supporting electrolyte salts of this invention, this corresponds to molar concentrations between about 0.005 molar and about 2.5 molar, and preferably between about 0.02 molar and about 2.0 molar for both the metal ion complexes and the quaternary ammonium supporting electrolyte salts.

Active metal salts useful in this invention comprise at least one cationic component comprising the cation of the active anode metal (M+). The anionic component of said active metal salt comprises at least one compound selected from the group consisting of the anion of the electrolyte salt ($X^-$), and anions which form salts of the active metal that are more soluble than $M^+X^-$.

Preferably, sufficient active metal salt is added to the cell solution to substantially saturate the solution in M+. Obviously, the most direct means of achieving M+ saturation, or near saturation, in solutions comprising a solvent and at least one supporting electrolyte salt of the form $R^+X^-$ is to add a slightly soluble salt of the active metal, $M^+X^-$. However, if $M^+X^-$ is not readily available or otherwise inconvenient to use, then a different active metal salt ($M^+Y^-$) can be used. In this event $M^+Y^-$ should be more soluble in the cell solution than $M^+X^-$, and $M^+Y^-$ should be added only in sufficient quantity to saturate the solution in $M^+X^-$. The following reaction results:

$$M^+Y^-(s) + X^- \rightarrow M^+X^-(s) + Y^-$$

Obviously, $Y^-$ is now present in solution as, hopefully, a contaminant which does not materially affect cell performance.

In general, a high concentration of $M^+$ in solution can result in asymmetrical deposition of the anode metal during change—analogous to the dendrite and morphology problems encountered during charge in the prior art cells. Thus, the concentration of $M^+$ should be as small as possible and still be consistent with desirable current densities. Rough bounds can be estimated by considering planar and porous electrodes at practical charging current densities. Assuming a planar anode with discharge product deposited on its surface, to achieve a charging current density of about 50 $mA/cm^2$, the $M^+$ concentration should be about $10^{-1}$ eq/l. Similarly, with porous electrodes, useful current densities can be achieved with $M^+$ concentration of about $10^{-9}$ eq/l and preferably between about $10^{-2}$ eq/l and about $10^{-5}$ eq/l.

Preferably, sufficient active metal salt should be added to the cell solution to substantially saturate the solution in $M^+$. Accordingly, the saturated concentration of $M^+$ should be between about $10^{-9}$ eq/l and about $10^{-1}$ eq/l, and preferably between about $10^{-5}$ eq/l and about $10^{-1}$ eq/l, provided, however, the saturated concentration of $M^+$ should always be less than the concentration of the supporting electrolyte salt.

In operation, the solvent plays an important role in solublizing the supporting electrolyte salt while not materially increasing the solubility of the active metal cation. Suitable combinations of solvents and active metals are those in which the active metal is substantially inert to the solvent. Thus, the metal and solvent should not physically or chemically react beyond the formation of a passivating film on the surface of the metal. Such films have been noted before in the art—in systems involving lithium and propylene carbonate or sulfur dioxide, for example. It is believed the film is some form of metal-solvent complex or reaction product which is not completely understood. This passivating film prevents substantial further attack of the solvent on the metal anode and also prevents substantial chemical or physical interaction between the anode metal and the electrolyte solution, including whatever soluble cathode depolarizers it contains.

Electrochemical interaction between electrolyte and the active metal anode is still possible through the passivating film, however. Operating in a manner akin to a conventional semi-permeable membrane, the film remains porous or conductive to cations of the anode metal and thus does not appear to substantially impede reduction and oxidation of the anode metal.

In the present invention, the precipitate formed on the anode during discharge is thought to be quite different from the passivating film described above. As noted previously, the components of the cell and the electrolyte in particular, have been chosen and combined such that the anode is an electrode of the second kind. While we do not wish to be bound by any theory, we believe the anode functions in the following way: During discharge the active metal is converted to metal cations ($M^+$) at the metal/passivating film interface. As the passivating film conducts $M^+$, $M^+$ cations are then expelled from the solution side of the passivating film into a solution which already contains some active metal cation and a relatively high concentration of an anion ($X^-$) which forms a slightly soluble salt with the metal cation. Under suitable conditions, we believe the ejected metal cation combines with the exess anion to form a slightly soluble salt, $M^+X^-$, which immediately precipitates on the anode. This discharge product precipitate forms a somewhat porous structure on the surface of the passivating film.

At substantially the same time, the cathode depolarizer is reduced at the positive electrode current collector. The products of this reduction process can be soluble or insoluble, depending upon the particular electrolyte and cathode depolarizer in use. Even with soluble reduction products at the current collector, however, in solutions which are saturated in $M^+$ ion it is possible that small amounts of a salt of the active metal may precipitate upon (or within the pores of) the positive electrode current collector.

During charge, we believe metal cations ($M^+$) at the metal/passivating film interface are reduced back to metal form. This results in metal cations entering the passivating film at the passivating film/solution interface, thus reducing the local concentration of $M^+$ in the vicinity of the anode. This causes $M^+$ in solution near (or within the pores of) the discharge product film, to diffuse to the passivating film surface, reducing the local concentration of $M^+$ still further and inducing the discharge product to redissolve to restore $M^+$ concentration.

It is clear from the above description that the interaction amount the passivating film, the discharge product precipitate and the solution, as well as the processes occurring at each interface can be quite complex and are not fully understood. In any event, however, we have been able to determine some critical factors necessary for proper operation of the battery in accord with the present invention. Our experiments indicate that once the anode material and cathode depolarizer are chosen (on the basis of the electrochemical potential or operating characteristics they will yield in a battery), the electrolyte (i.e., the supporting electrolyte salt, solvent and active metal salt) useful in the present invention are to be chosen substantially in accord with two critical selection criteria.

First, the solubility of the active metal cation ($M^+$) in the electrolyte solution should be quite low. In functional terms, the amount of $M^+$ in cell solution should be small, but preferably enough to substantially saturate the solution prior to the first cycle. As noted earlier, there are competing considerations involved here. High amounts of the metal cation are desirable to support reasonable current densities and charge rates; low concentrations of the metal cation are desirable to help avoid shape change problems. However, as the discharge precipitate is believed to be formed at the anode in the present invention, we are not dependent upon metal cation ($M^+$) transport between electrodes. Accordingly, relatively low solubility of $M^+$ is desirable and workable. While $M^+$ concentrations less than saturation appear to yield cells which can be cycled, our tests have shown that cycling performance improves as the $M^+$ concentration approaches the saturation point for the particular cell solution. (This is also the condition which yields an anode which is an electrode of the second kind.)

Second, the electrolyte should contain at least one supporting electrolyte salt of the form $R^+X^-$, wherein $R^+$ is not $M^+$, and $X^-$ forms a salt with $M^+$ which is less soluble in the solution than $R^+X^-$. As noted previously, the electrolyte preferably contains a high concentration of $X^-$ relative to $M^+$ concentration.

The salient point of these criteria is that metal cations $M^+$ ejected from the anode during discharge should encounter a cell solution in which there is little or no tolerance for additional metal cations and a relatively high concentration of anions $X^-$ with which they form a slightly soluble salt $(M^+X^-)$. This combination of factors coupled with the fact that salt $M^+X^-$ is less soluble than $R^+X^-$, results in the precipitation of the discharge product $(M^+X^-)$ on the anode. Means of achieving and optimizing the proper concentration levels of $M^+$ and $X^-$ anion at discharge will be apparent to those skilled in the art.

As the cells and electrolyte of this invention represent a departure from conventional thinking in the relevant art, we encountered certain hitherto unknown phenomena. A particularly bizarre effect was observed when a fresh lithium foil anode was introduced into a cell containing an electrolyte of liquid $SO_2$ and about 0.2M tetrabutyl ammonium perchlorate (hereinafter "TBAP"). No active metal salt was present in solution. In such a system, the liquid $SO_2$ functions as both solvent and cathode depolarizer and is expected to form a passivating film on the Li surface.

As soon as the lithium foil was immersed in the $SO_2$/TBAP solution (which is normally quite clear), dark red billows began streaming from the surface of the Li. This so-called "bleeding" effect was repeatedly observed and generally quickly resulted in an opaque red electrolyte solution. Measurements of open circuit voltages (OCV) taken while the bleeding was in progress showed somewhat erratic and reduced voltages.

The bleeding phenomena also appeared somewhat dependent upon the temperature of the solution. At room temperature, the bleeding was so profuse that the red material appeared to be streaming from the entire surface of the Li. When the cell container was immersed in a bath of dry ice and isopropanol, however, the bleeding was considerably reduced and distinct source points on the Li could be discerned.

It was theorized that the red material streaming from the Li was some form of a $SO_2 \cdot S_2O_4^=$ complex formed by direct reduction of the $SO_2$ in solution at the surface of the Li. It is believed that impurities on the Li surface are responsible for this direct reduction of the $SO_2$ in solution. In effect, each impurity acts as a positive electrode, directly reducing the cathode depolarizer at the Li surface and "self-discharging" the Li anode. The OCV measurements appeared to confirm this.

Experiments were subsequently undertaken to confirm the nature of the bleeding phenomena and identify precautions necessary to prevent the self-discharge process. Electrolyte solutions of $SO_2$/TBAP (about 0.2M) were prepared and maintained in a dry room and cooled in a dry-ice and isopropanol bath to reduce the $SO_2$ vapor pressure. Commercially obtained lithium foil was cut in a glove box containing an inert atmosphere and then dipped into the electrolyte. Bleeding was immediately observed at the points where the foil had been handled with metal forceps. Scraping the bleeding area with a glass rod only appeared to spread the bleeding area.

A second piece of foil was then cut, handled only with vacuum degreased metal forceps and dipped into the electrolyte. No bleeding was observed. The foil was then scraped with a glass rod both above and below the solution level and no bleeding was observed. These results suggest that bleeding is not caused by breaks in the passivating film on the surface of the Li, and indeed, the passivating film appears to be self-healing. The OCV of the non-bleeding foil versus a carbon reference electrode was about 2.3 volts.

The non-bleeding foil was then removed from the electrolyte and several small particles (about 0.1 mm dia.) of carbon cathode material were impregnated into the Li surface with a glass rod in the dry room. Upon immersion into the electrolyte, bleeding was immediately observed at the sites of the carbon particles. The OCV of the carbon impregnated foil was now decreased by about 0.2 volts.

These results appear to confirm that bleeding is caused by self-discharge of the anode due to the presence of conducting impurities on the anode surface. Several repetitions of the above impregnation experiments in which lithium foil was impregnated with non-conducting glass chips demonstrated that non-conducting impurities do not cause bleeding.

The same Li foil with the impregnated carbon particles was then immersed in a 16.5% (by weight) solution of $Li_2B_{10}Cl_{10}$ and $SO_2$ electrolyte in a dry ice and isopropanol bath. No bleeding was observed in this $Li^+$ containing solution. This was anticipated as we expected the presence of a high concentration of $Li^+$ to "seal" the bleeding site by forming $Li_2S_2O_4$ precipitate over the carbon particles (the sites of the $S_2O_4^=$ production).

Efforts to eliminate conductive contaminants by vapor depositing thin films of lithium on glass substrates proved quite successful. Such vapor deposited thin films (on the order of 1 micron) exhibited no bleeding in $SO_2$/TBAP electrolytes and possessed stable OCV's with respect to carbon reference electrodes. Thus, we found the bleeding or self-discharge phenomena of Li in $SO_2$/TBAP electrolytes can be substantially eliminated by (1) exercising extreme care in handling commercial Li foil; and (2) forming the Li anode by vapor deposition on a non-conducting substrate.

Surprisingly, we also found that even contaminated Li foil does not bleed in electrolytes of $SO_2$ and transition metal complexes such as $Mn(2,2'-dipyridyl)_3(ClO_4)_2$ and
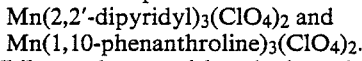

While we do not wish to be bound by any theory, two possible explanations present themselves. As neither of the dithionite salts of these metal ion complexes is appreciably soluble in $SO_2$, $Mn(2,2'-dipyridyl)_3S_2O_4$ or $Mn(1,10-phenanthroline)_3S_2O_4$ may be precipitating at the site of $S_2O_4^=$ production, thereby sealing each site against further $SO_2$ reduction. Alternatively, the stability of the complex may favor the formation of $MnS_2O_4$ which then precipitates to seal any potential bleeding or self-discharge site. In any event, it appears that electrolytes comprising supporting electrolyte salts of transition metal complexes are self-healing with respect to the self-discharge phenomena. It should be understood that these "sealing" processes to prevent self-discharge caused by conductive impurities form localized "healing" precipitates which are separate and distinct from the "passivating film" formation associated with immersion of Li in $SO_2$.

As noted, a significant feature of the present invention and the principal reason it can operate as a secondary cell is the ability to induce the M+ ion produced during discharge to form a precipitate on the anode, and thereafter, to induce the ion to return to metal form during charge. Thus, the reversible formation/dissolution of the anode discharge product is very important.

It was therefore important to experimentally demonstrate that the observed currents were indeed due to substantially reversible formation of the discharge product. In short, we undertook to demonstrate that the observed current was due to the active anode metal cycling from M° (original state), to M+ (in the form $M^+X^-$ during discharge), and back to M° (during charge), rather than from any other process which irreversibly consumed the anode. This could be demonstrated if more coulombs could be drawn from the cell over the span of numerous discharges than the calculated coulomb content of the initial active material of the anode. In this event, the assumption could be made that the anode material must have been cycled and reused. Consequently, the quantity of charge equal to the total original coulomb content of the anode was defined as one "turnover". The number of "turnovers" (i.e., the number of multiples of the total coulomb content of the anode) a cell is capable of delivering before breakdown is therefore an indication of the lifetime and cyling efficiency of the cell.

In carrying out our experiments, we typically performed an extended first discharge (or "forming discharge") to build up a working quantity of the discharge product precipitate on the surface of the anode. It is believed it is desirable to build up a sufficient reserve of discharge product material for use during subsequent charges to allow for inefficiency. The duration of this forming discharge was typically 3 to 4 times the charge/discharge cycle length.

EXAMPLE I

A. Preparation of Supporting Electrolyte Salt

The general procedure for preparing a supporting electrolyte salt of $Mn(2,2'-dipyridyl)_3(ClO_4)_2$ was the following: 1000 ml of $H_2O$ was mixed with 1.70 g of $MnSO_4.H_2O$ and 5.00 g of 2,2'-dipyridyl in a 2 liter beaker and heated to about 50° C. while stirring. After all ingredients had dissolved, about 5.28 g of $LiClO_4$ was added. Stirring was continued but the heat was turned off. As crystals began to form, nitrogen was blown over the solution to inhibit oxygen contact. The crystals were allowed to form until a usable quantity appeared on the bottom of the beaker (typically about 1-2 hours). The $Mn(2,2'-dipyridyl)_3(ClO_4)_2$ crystals were then filtered from the solution and dried under vacuum at about 150° C. for about 2-4 hours. (This procedure adapted from J. Inorg. Nucl. Chem. 9, 211(1959).)

B. Preparation of Purified $SO_2$ $SO_2$ was purchased commercially in cylinders that were specially "baked-out" prior to filling to prevent $H_2O$ contamination. The $SO_2$ in gaseous form at about 18-20 psi was then passed through evacuated stainless steel tubing and a system of flow regulators and check valves into the bottom of a glass column containing glass wool impregnated with $P_2O_5$. The $SO_2$ was passed through the glass wool $P_2O_5$ and then passed to a receiver tube maintained in an ice bath. Purified $SO_2$ condensed in the receiver tube. Approximately 200 cc of liquid $SO_2$ could be purified in approximately three hours. The purification system was periodically flushed with argon or nitrogen and evacuated with a vacuum pump.

C. Preparation of Electrolyte Solution

About 1.83 grams of solid supporting electrolyte salt from Step A was placed in a pressurized glass "purifying cell". 198.5 grams of liquid $SO_2$ in the purifying receiver of Step B was then transferred under pressure (i.e., at the vapor pressure of $SO_2$ at ambient temperature to maintain the $SO_2$ at ambient and in liquid state) into the purifying cell. The solution in the purifying cell was then stirred until all solid material was dissolved. The purifying cell and battery cell were connected with the purifying cell directly above the battery cell. A valve between them allowed for transfer of the purifying cell solution into the battery cell. After being evacuated, the battery cell was filled under pressure from the purifying cell to a height which just covered the anode foil.

In subsequent Examples, additional active metal salt or supporting electrolyte salt was placed in the battery cell prior to filling as noted in Tables II and IV. It should be noted that the amount of active metal salt and supporting electrolyte salt actually in the battery cell during operation was somewhat less than the sum of the amounts added to the purifying and battery cells. Specifically, Tables II and IV indicate the amounts added to the purifying and battery cells individually, but it should be emphasized that not all of the $SO_2$ solution in the purifying cell was transferred to the battery cell. The actual amount of $SO_2/LiClO_4$ solution transferred in each Example is also listed in Tables II and IV.

D. Cell Construction and Operation

A. 1.4 mil Li foil was used as the anode. The Li was supported in a polypropylene holder to impart rigidity and to protect the electrode from exposure to the liquid/vapor interface of the cell. In earlier work, it was observed that extensive corrosion of the foil took place at the liquid/vapor interface. As this caused mechanical failure in some cases, a polypropylene holder was devised which simultaneously shielded the electrode from contact with the interface and provided a means of connecting a 40 mil Li lead-in to the foil electrode. The cell was filled until the holder was partially (about half) submerged. For maximum flexibility, a total of three electrodes were immersed in the solution: a Li foil anode, a carbon reference, and a porous positive carbon current collector of 15% 30B Teflon and 85% Shawinigan black (about 60 m² in surface area). In Examples II through VIII, a fourth electrode, a lithium reference electrode, was also immersed in the cell solution.

The cell was pressurized at the vapor pressure of $SO_2$ at ambient temperature. A peculiarity of our cell design was the electrode feedthroughs at the top cover of the cell were relatively close together. We discovered that $SO_2$ condensation on the underside of the cover sometimes caused shorts between electrodes. To prevent this condensation, the top cover was heated to about 35° C., but the cell itself and the cell solution were not heated.

For comparison purposes, the electrolyte of this cell was not prepared in accord with the present invention in that no active metal salt was present in the electrolyte. One complete cycle comprised a discharge period of approximately 30 minutes, about a 3 minute period at open circuit, and a charge period of about 30 minutes. Other relevant cell composition and performance details are contained in Tables I and II.

The following notations were employed in Table I and subsequent tables: $Mn(2,2'\text{-dipyridyl})_3(ClO_4)_2$ supporting electrolyte salt is denoted "B"; $Mn(1,10\text{-phenanthroline})_3(ClO_4)_2$ is denoted "P"; "SES" stands for "supporting electrolyte salt"; "AMS" stands for "active metal salt"; the current densities listed are for both the charge and discharge portions of each cycle; "AMS sat'n %" refers to the degree (percentage) of saturation brought about by the addition of the active metal salt to the electrolyte solution; and the efficiencies refer to plating efficiencies based upon the assumption that the only mechanism by which the amount of available Li was reduced was partial irreversibility of discharge product formation.

As noted, the cell of Example I had no $LiClO_4$ added to it. In operation, the anode of this cell was observed to deteriorate rapidly—it began to corrode and dissolve after only a few cycles. The anode was almost completely consumed and cell breakdown occurred before one turnover.

EXAMPLES II-V

The cells were constructed substantially in accord with the procedures of Example I with the following exceptions:

(1) An additional purification step was added in the preparation of purified $SO_2$. The gaseous $SO_2$ was first bubbled through a glass column containing glass wool and $H_2SO_4$ before proceeding to the glass wool/$P_2O_5$ column. This was intended to help remove $SO_3$.

(2) Active metal salt ($LiClO_4$) was added to each cell to produce increasing $LiClO_4$ concentrations. In prior experiments, we had noted an apparent relationship between the saturated concentration of the active metal salt and the concentration of the supporting electrolyte salt. In general, the former increased with the latter. Thus, a cell less than 100% saturated in $LiClO_4$ could be made by adjusting the supporting electrolyte salt concentration. Specifically, the cell of Example II was first saturated in $LiClO_4$. All excess undissolved $LiClO_4$ was then removed from the cell and sufficient supporting electrolyte salt was added to bring the $LiClO_4$ concentration to about 30% saturated. The cell of Example III was approximately 100% saturated, but no solid excess $LiClO_4$ remained in the bottom of the cell. Accordingly, while enough $LiClO_4$ was added to the cell of Example III to substantially saturate the solution, actual saturation could not be confirmed with certainty. Sufficient $LiClO_4$ was added to the cells of Examples IV and V to result in excess solid $LiClO_4$ in the bottom of the cell. The actual amounts of supporting electrolyte salt and $LiClO_4$ placed in the purifying cell and battery cell in each Example are noted in Table II.

(3) Each cell was stirred with a magnetic stirrer during operation.

Composition and performance details are listed in Tables I and II.

EXAMPLE VI

A. Preparation of Supporting Electrolyte Salt

The general procedure for preparing a supporting electrolyte salt of $Mn(1,10\text{-phenanthroline})_3(ClO_4)_2$ was the following: 1000 ml of $H_2O$ was mixed with 1.70 g of $MnSO_4 \cdot H_2O$ and 6.00 g of 1,10-phenanthroline $H_2O$ in a 2 liter beaker and heated to about 50° C. while stirring. After all ingredients had dissolved, 2.20 g of $LiClO_4$ was added. Stirring was continued but the heat was turned off. As crystals began to form, nitrogen was blown over the solution.

The $Mn(1,10\text{-phenanthroline})_3(ClO_4)_2$ crystals were filtered, collected and dried in vacuum at about 180° C. for 2-4 hours. (This procedure adapted from J. Inorg. Nucl. Chem. 9, 211(1959)).

All other aspects of the cell were substantially identical to Example I. For comparison purposes, no $LiClO_4$ was added to the electrolyte. Composition and performance details are contained in Tables III and IV.

EXAMPLES VII AND VIII

The supporting electrolyte salts were prepared as in Example VI. All other aspects of Example VIII were prepared in accord with Examples II-V.

For Example VII, however, a solution less than 100% saturated in $LiClO_4$ was prepared substantially in accord with the method employed in Example II (i.e., saturation first, followed by unsaturation through the addition of supporting electrolyte salt). Further, an additional $SO_2$ purification step was performed. After leaving the acid and $P_2O_5$ purifying columns, the liquid $SO_2$ was routed to a vessel containing strips of lithium foil and pressurized at the vapor pressure of $SO_2$ at ambient. The liquid $SO_2$ was kept in the lithium-containing vessel for at least overnight prior to use. This step was expected to help remove any impurities that were reactive with lithium.

Composition and performance details are contained in Tables III and IV.

EXAMPLE IX

The general procedures for cells employing tetra-n-butyl ammonium perchlorate (TBAP) as the supporting electrolyte salt was the following:

A. Electrolyte Preparation

"Electrometric grade" TBAP was purchased commercially and vacuum dried for at least three days. For two of the three days, the TBAP was heated over a boiling water bath. The dried TBAP was kept stored in an argon glove box.

Lithium perchlorate, to be used as the active metal salt, was dried on a vacuum rack with a diffusion pump for at least three days at about 130° C. Afterwards, the $LiClO_4$ was kept in an argon glove box. The moisture content of the TBAP and $LiClO_4$ was measured to be less than 150 ppm.

About 3.76 g TBAP and 0.9 g of $LiClO_4$ was placed in an electrolyte container in the glove box. The container was connected to an $SO_2$ distillation line and slowly evacuated. During evacuation, the container was immersed in an isopropanol-dry ice bath and brought to about $-50°$ C.

The line between the container and the $SO_2$ distillation rack was evacuated. Gaseous $SO_2$ was then bubbled through a concentrated $H_2SO_4$ bath at less than 1 atm. and routed through a $P_2O_5$ drying column and into the electrolyte container. The electrolyte container was brought to and maintained at about $-60°$ C. during distillation. The $SO_2$ was shut off with about 60 ml of $SO_2$ in the electrolyte container. The resulting TBAP concentration was about 0.18 eq/l.

B. Electrode Preparation

Five to ten glass slides were washed, scrubbed with Chem-solv, and thoroughly rinsed. About ½ inch length of commercial lithium foil was then placed in a molybdenum container in preparation for vacuum vapor deposition of a thin lithium film on a clean glass slide. Deposition was carried at about $10^{-6}$ mbar vacuum in an Edwards Co. vacuum deposition apparatus (Model E 306A) for about 30 to 60 minutes. Obviously, film thickness was dependent upon deposition time. The deposition time for each electrode was determined by trial and error—very short times yielded films that were too thin for good cell performance. After deposition was complete, the slide was exposed to a mixture of $O_2$ and argon for about 20 minutes at about 5 psi.

The resulting glass slide coated with a thin lithium film was then wrapped at one end with a 0.01 inch thick Li ribbon, followed by an Ni ribbon to act as a tab connector. The slide was then dipped in wax until both ends were covered with wax, leaving a rectangle of lithium film about 1.5×2.5 cm in size left exposed.

C. Cell Assembly

It should be stressed that cleanliness was essential. Clean, dry latex gloves (washed well with soap and water and rinsed with ethanol) and filter masks were used at all times in assembling the cell and handling the glass slide anode. Care was also taken to avoid cross contamination due to unclean tools or improper washing. All assembly was performed in a dry room (less than 1% relative humidity).

The lithium anode, carbon current collector and any reference electrodes that were used were inserted into stainless steel feedthroughs in the polypropylene top of a glass cell cylinder. A stainless steel fill tube extended through the top of the cell to beneath the electrolyte level. The electrolyte container and cell were then connected, and the connecting line between them was repeatedly evacuated and flushed with argon. The valve between the electrolyte container and the cell was slowly opened to transfer the electrolyte into the cell. When all of the exposed portion of the Li film on the anode was covered with electrolyte, the filling was complete.

The extreme care taken to avoid contamination, coupled with the vapor deposition method of making the anode, resulted in a cell free of the self-discharge or bleeding phenomena observed in previous cells. It should be noted that no stirring of the electrolyte or cell was done to dissolve the LiClO$_4$ salt. In this example two lithium electrodes on glass slides were prepared simultaneously. The SO$_2$/TBAP electrolyte was prepared about 3 days prior to use. During operation, both lithium electrodes and a carbon (15% Teflon 7C, 85% Shawinigan Black) electrode were inserted into the electrolyte. The cell was then cycled through numerous charge discharge cycles with each lithium electrode being cycled versus the other lithium electrode. The carbon electrode was used only as a reference electrode against which the OCV measurements were taken.

Composition and performance details of this cell are contained in Table V. The same assumptions and definitions regarding efficiency and turnovers made in Tables I and III also pertain to Table V.

EXAMPLE X

The cell components were prepared in accord with the method of Example IX. 4.1 g of TBAP and 0.32 g of LiClO$_4$ were added to 60 ml of SO$_2$ to form the electrolyte in the electrolyte container. About 0.5 g of additional LiClO$_4$ was added to the battery cell prior to filling. Sufficient LiClO$_4$ was present in the cell to substantially saturate the cell solution. The electrolyte was mechanically stirred for about 63 hours prior to filling the cell, but the cell itself was not stirred after filling. One lithium anode on glass and two carbon electrodes were inserted into the cell. All cycling was done between the lithium anode and a carbon current collector. After 246 cycles, the cell failed from deterioration of the Li anode. Composition and performance details are summarized in Table V.

EXAMPLE XI

The cell components were prepared in accord with the method of Example IX. 6.84 g of TBAP and 1.5 g of LiClO$_4$ were added to 100 ml of SO$_2$ in the electrolyte container to form the electrolyte. No additional LiClO$_4$ was added to the cell. Sufficient LiClO$_4$ was present in the cell to substantially saturate the cell solution. The electrolyte was ultrasonically stirred for about 1 hour prior to filling the cell and the ultrasonic stirring was continued during cycling. To compensate for heating effects caused by the ultrasonic stirring, the cell was maintained in a cooling bath at about 20° C. All cycling was performed between the lithium anode and a carbon current collector. After 456 cycles, the cell failed from deterioration of the anode. Composition and performance details are summarized in Table V.

EXAMPLE XII

The cell components were prepared in accord with the method of Example IX. 2.73 g of TBAP and 0.11 g of LiClO$_4$ were added to 40 ml of SO$_2$ in the electrolyte container to form the electrolyte. No additional LiClO$_4$ was added to the cell. For comparison purposes, the quantity of LiClO$_4$ present was not sufficient to saturate the cell solution. The electrolyte was mechanically stirred for about 20 hours prior to filling the cell; the cell itself was not stirred after filling. All cycles were performed between the lithium anode and a carbon current collector. As expected, the the unsaturated electrolyte performed poorly—the cell failed due to deterioration of the anode after 104 cycles (less than one turnover). Composition and performance details are summarized in Table V.

Some observations are noteworthy. In general, cells unsaturated in the active metal salt (AMS) failed quicker than saturated cells—although some cycling was accomplished. In addition, it appears that Examples X and Example XI did not perform as well as Example IX, although all three were substantially saturated in LiClO$_4$ as the AMS.

The degraded performance of Examples X and XI is believed to be due to the presence of excess water. Measurements performed after the cells failed indicate that the LiClO$_4$ used in these cells contained about 274 ppm H$_2$O. This water, when combined with estimates of the water content of the TBAP and SO$_2$, yield an estimate of about $2.5 \times 10^{-5}$ moles of H$_2$O in the electrolyte. As the lithium electrode typically contained about $4 \times 10^{-5}$ moles of lithium, water content of the order of $10^{-5}$ moles could cause significant loss of Li from the surface of the anode.

In addition, as previously noted, increasing the concentration of the supporting electrolyte salt appeared to increase the saturated concentration of the active metal salt. As both salts have the same anion, this result is somewhat anomalous and is not fully understood. Nevertheless, this effect may be utilized to adjust the solubility of the active metal salt. In short, it may be possible to bring the saturated concentration of the active metal salt into a suitable operating range in accord with this invention through judicious selection and adjustment of the supporting electrolyte salt concentration.

TABLE I

|  | \multicolumn{5}{c}{Example} |
|---|---|---|---|---|---|
|  | I | II | III | IV | V |
| SES | B | B | B | B | B |
| SES conc. (eq/l) | 0.036 | 0.13 | 0.042 | 0.056 | 0.048 |
| AMS | LiClO$_4$ | LiClO$_4$ | LiClO$_4$ | LiClO$_4$ | LiClO$_4$ |
| AMS sat'n % | 0 | ~30 | ~100 | 100 | 100 |
| AMS conc. (eq/l) | 0 | 0.018 | 0.018 | 0.018 | 0.018 |
| No. of cycles | 13 | 83 | 210 | 269 | 210 |
| No. of Li Turnovers | <1 | 3.5 | 9.0 | 11.6 | 10.5 |
| Efficiency (%) | — | 71.1 | 88.9 | 91.4 | 90.5 |
| Initial OCV (v) | 3.17 | 3.03 | 2.95 | 2.92 | 2.92 |
| Mid-cycle OCV (v) | 2.9 | 2.92 | 2.97 | 2.94 | 3.01 |
| Current density ($\mu$A/cm$^2$) | 50 | 475 | 475 | 475 | 475 |
| ½ cycle length (min.) | 30 | 30 | 30 | 30 | 30 |
| Forming discharge length (hrs.) | 3 | 3.3 | 3.6 | 3.7 | 5.3 |
| % change in solution resist. | −9 | +9 | — | — | +8 |

TABLE II

Electrolyte Composition (All Weights in Grams)

|  | \multicolumn{5}{c}{Example} |
|---|---|---|---|---|---|
|  | I | II | III | IV | V |
| Supporting Electrolyte Salt (SES) | B | B | B | B | B |
| Total weight | 1.83 | 2.95 | 1.45 | 1.44 | 1.44 |
| In purifying cell | 1.83 | 1.45 | 1.45 | 1.44 | 1.44 |
| In battery cell | 0 | 1.50 | 0 | 0 | 0 |
| Active Metal Salt (AMS) | LiClO$_4$ | LiClO$_4$ | LiClO$_4$ | LiClO$_4$ | LiClO$_4$ |
| Total weight | 0 | 0.402 | 0.200 | 0.503 | 0.802 |
| In purifying cell | 0 | 0.402 | 0.099 | 0.401 | 0.401 |
| In battery cell | 0 | 0 | 0.101 | 0.102 | 0.401 |
| Solvent | SO$_2$ | SO$_2$ | SO$_2$ | SO$_2$ | SO$_2$ |
| Wt. in purifying cell | 198.5 | 125.2 | 132.4 | 101.1 | 117.4 |
| Wt. transferred to battery cell |  | 66.2 | 70.4 | 58.1 | 75.5 |

TABLE III

|  | \multicolumn{3}{c}{Example} |
|---|---|---|---|
|  | VI | VII | VIII |
| SES | P | P | P |
| SES conc. (eq/l) | 0.038 | 0.14 | 0.038 |
| AMS | LiClO$_4$ | LiClO$_4$ | LiClO$_4$ |
| AMS sat'n % | 0 | ~40 | 100 |
| AMS conc. (eq/l) | 0 | 0.015 | 0.015 |
| No. of cycles | 64 | 78 | 187 |
| No. of Li Turnovers | <1 | 3.6 | 8.1 |
| Efficiency (%) | — | 72.3 | 87.6 |
| Initial OCV (v) | 3.07 | 3.01 | 2.91 |
| Mid-cycle OCV (v) | 2.85 | 2.98 | 2.98 |
| Current density ($\mu$A/cm$^2$) | 50 | 475 | 475 |
| ½ cycle length (min.) | 30 | 30 | 30 |
| Forming discharge length (hrs.) | 4.7 | 4.5 | 3.7 |
| % change in solution resist. | — | −7 | +10 |

TABLE IV

Electrolyte Composition (All Weights in Grams)

|  | \multicolumn{3}{c}{Example} |
|---|---|---|---|
|  | VI | VII | VIII |
| Supporting Electrolyte Salt (SES) | P | P | P |
| Total weight | 2.09 | 3.09 | 1.21 |
| In purifying cell | 2.09 | 1.58 | 1.21 |
| In battery cell | 0 | 1.51 | 0 |
| Active Metal Salt (AMS) | LiClO$_4$ | LiClO$_4$ | LiClO$_4$ |
| Total weight | 0 | 0.404 | 0.802 |
| In purifying cell | 0 | 0.404 | 0.402 |
| In battery cell | 0 | 0 | 0.400 |
| Solvent | SO$_2$ | SO$_2$ | SO$_2$ |
| Wt. in purifying cell | 189.1 | 114.7 | 115.2 |
| Wt. transferred to battery cell |  | 57.8 | 60.2 |

TABLE V

|  | \multicolumn{4}{c}{Example} |
|---|---|---|---|---|
|  | IX | X | XI | XII |
| SES | TBAP | TBAP | TBAP | TBAP |
| SES conc. (eq/l) | 0.18 | 0.20 | 0.20 | 0.20 |
| AMS | LiClO$_4$ | LiClO$_4$ | LiClO$_4$ | LiClO$_4$ |
| AMS sat'n % | 100% | 100% | 100% | ~70% |
| AMS conc. (eq/l) | 0.035 | 0.035 | 0.035 | 0.025 |
| No. of cycles | 1,785 | 246 | 456 | 104 |
| No. of Li Turnovers | ~30 | 2.73 | 2.98 | 0.85 |
| Efficiency (%) | 97.2 | 81.9 | 83.2 | 40.8 |
| Initial OCV (v) | 3.11 | 3.02 | 2.99 | 2.99 |
| Mid Test OCV, (v) (after # cycles) | 3.15 (836) | 3.27 (127) | 3.03 (260) | none |
| Current density ($\mu$A/cm$^2$) | ~12 | 14 | 14 | 11 |
| ½ cycle length (min.) | 10 | 10 | 10 | 10 |
| Forming discharge length (min) | 20 | 20 | 20 | 20 |
| Stirred Electrolyte | No | Yes | Yes | Yes |
| Cell | No | No | Yes | No |

We claim:

1. A non-aqueous, rechargeable electrochemical cell comprising:
   (a) an active metal anode;
   (b) a positive electrode current collector; and
   (c) an electrolyte comprising a salt of said active metal, an ionizing solvent comprising sulfur dioxide, and a supporting electrolyte salt comprising at least one component of the general form R$^+$X$^-$, wherein R$^+$ is a cation different from the cation of said active metal, and X$^-$ is an anion which forms a salt with the cation of said active metal which is less soluble in said cell than R$^+$X$^-$; wherein the saturated concentration of said active metal cation in said electrolyte is between about 10$^{-9}$ eq/l and about 10$^{-1}$ eq/l, and said electrolyte is substantially saturated with respect to the active metal cation, whereby an insoluble product is formed at the anode upon discharge of the cell.

2. The cell of claim 1 wherein said anode comprises at least one metal selected from the group consisting of lithium, sodium, potassium, beryllium, magnesium, and calcium.

3. The cell of claim 2 wherein said electrolyte comprises:

(a) an ionizing solvent comprising sulfur dioxide;
(b) a salt of said active metal having at least one cationic component comprising the cation of the active anode metal, and at least one anionic component comprising the anion of the supporting electrolyte salt; and
(c) a supporting electrolyte salt wherein $R^+$ comprises at least one cation selected from the group consisting of metal ion complexes and nitrogen and phosphorus organic cations, and $X^-$ comprises at least one anion selected from the group consisting of anions of oxyhalides and oxyacids.

4. The cell of claim 3 wherein said ionizing solvent consists essentially of sulfur dioxide.

5. The cell of claim 3 wherein said active metal comprises lithium and said active metal salt comprises at least one compound selected from the group consisting of $LiClO_4$ and $Li_2S_2O_4$.

6. The cell of claim 3 wherein $R^+$ comprises at least one material selected from the group of cations consisting of alkali metals complexed with crown ethers, alkali metals complexed with cryptands, transition metals complexed with ligands and chelates, transition metals complexed with chelating ligands, the cations of quaternary ammonium and phosphonium salts and N-hydrocarbo heterocyclic cations.

7. The cell of claim 6 wherein $R^+$ comprises at least one cation selected from the group consisting of $Mn(2,2'\text{-dipyridyl})_3^{++}$, $Mn(1,10\text{-phenanthroline})_3^{++}$ and $(n\text{-butyl})_4N^+$.

8. The cell of claim 6 wherein $R^+$ comprises $Mn(2,2'\text{-dipyridyl})_3^{++}$.

9. The cell of claim 6 wherein $R^+$ comprises $Mn(1,10\text{-phenanthroline})_3^{++}$.

10. The cell of claim 6 wherein $R^+$ comprises $(n\text{-butyl})_4N^+$.

11. The cell of claim 6 wherein $R^+$ comprises a quaternary ammonium cation.

12. The cell of claim 6 wherein $X^-$ comprises at least one anion selected from the group consisting of perchlorate and dithionite.

* * * * *

UNITED STATES PATENT OFFICE
CERTIFICATE OF CORRECTION

Patent No. 4,520,083                               Dated May 28, 1985

Inventor(s) Keith B. Prater, Robert J. Thrash and John F. Connolly

It is certified that error appears in the above-identified patent and that said Letters Patent are hereby corrected as shown below:

Column 2, line 68, "shown" should read --show--.

Column 5, line 51, "maagnesium" should read --magnesium--.

Column 8, line 29 "$M_+$" should read --$M^+$--.

Column 8, line 30, "$R^+X^-$ solvent" should read --$R^+X^-$ in the solvent--.

Column 10, line 2, "$M^+,M30$" should read --$M^+$, $M^+$--.

Column 10, line 35, "amount" should read --among--.

Signed and Sealed this

Twenty-fourth Day of December 1985

[SEAL]

Attest:

DONALD J. QUIGG

Attesting Officer    Commissioner of Patents and Trademarks